Aug. 19, 1969   R. W. GOODRUM   3,462,176
ROTATABLE COUPLING WITH PASSAGES
Filed Feb. 27, 1967   2 Sheets-Sheet 1

United States Patent Office 3,462,176
Patented Aug. 19, 1969

3,462,176
ROTATABLE COUPLING WITH PASSAGES
Richard W. Goodrum, Baton Rouge, La., assignor to Ethyl Corporation, New York, N.Y., a corporation of Virginia
Filed Feb. 27, 1967, Ser. No. 618,713
Int. Cl. F16l 39/00
U.S. Cl. 285—136                    8 Claims

ABSTRACT OF THE DISCLOSURE

An apparatus for coupling a stationary conduit to a rotating conduit adapted to carry flowable material at high temperature and pressure. The apparatus is particularly suited for coupling a plastic extruder to a rotating extrusion die. The coupling includes a stationary base having an inner upstanding annular wall section which receives over it the lower section of a rotatable support assembly in a close rotating fit. Bearing means rotatably join the stationary base to the upper rotatable support assembly. The rotatable support assembly is provided with one or more passageways which continuously connect with one or more openings provided in the stationary base whereby utilities such as air, steam, hot oil, may be supplied to the extrusion die.

BACKGROUND OF THE INVENTION

Field of the Invention

In general this invention relates to a coupling for connecting a rotatable conduit to a stationary conduit, in particular to one having utility passageways therein whereby the coupling is especially adapted for connecting a stationary plastic extrusion apparatus to an annular rotating die which requires utility services.

Description of the prior art

In U.S. Patent 3,020,588 there is disclosed a rotary plastic extrusion die utilized for the production of plastic film by the blown tube method. As pointed out in the foregoing patent plastic film manufactured by the blown tube method utilizing a fixed annular die is subject to irregularities in thicknesses across the width of the film caused by non-uniformity of spacing of the lips of the annular die. The patent teaches a solution to the problem by rotating the annular die in order to distribute the film thickness variations across the width of the film. By distributing the non-uniformity in thickness spirally around the blown tube the lay-flat characteristics and appearance of the finished film is substantially improved. The rotating extrusion die utilized in the above noted patent requires that air be supplied through a fitting periodically in order to maintain the plastic film bubble at the correct stage of inflation. This requires stopping the die or having the air supply hose of sufficient length to permit it to coil around the die a number of times as air is being supplied to the bubble.

In co-pending patent application Ser. No. 619,414, filed Feb. 28, 1967, there is disclosed an improved rotatable coupling adapted to be used with an annular rotating die. The rotating joint or coupling disclosed in the foregoing application is characterized in that it does not require the use of plastic or rubber or metallic seals for those spaces exposed to the molten plastic. Extremely close tolerances are provided between the mating portions of the rotating joint whereby a small amount of plastic is permitted to extrude between the stationary and rotating members.

Each of the foregoing rotating couplings or joints require that air or other services needed by the rotating die be supplied periodically by intermittent application from an outside source. Usually it is necessary to supply the extrusion die with some form of heat. It is economically desirable to utilize high pressure steam for heating the annular die. Additionally there is a need, as explained heretofore, for a continuous supply of air to the rotatable die to maintain inflation of the tube.

Thus it is seen that there is a need for a rotatable coupling for attaching an annular die to a plastic extruder which provides passages therethrough permitting the supplying of utilities such as air, steam, water, refrigerant, etc., to the rotating die or to the space enclosed by the plastic blown tube above the die.

SUMMARY OF THE INVENTION

Therefore it is an object of the present invention to provide a rotatable coupling which contains one or more passageways whereby utilities such as steam, air, water, may be supplied to the rotating object coupled thereto.

The foregoing objects and other advantages of the invention are realized in a rotatable coupling having an axial opening therein which includes a stationary base portion cooperating with a rotatable support assembly. The stationary base includes a lower portion adapted to be coupled to another object and an upper portion having an annular recess provided in the top face thereof defining an outer wall section. The outer wall section provides at least one opening therethrough. The recess together with the axial opening through the base defines an annular inner wall section. The rotatable support assembly includes a center cylindrical portion providing a cylindrical recess in the bottom thereof which receives the annular inner wall section of the base. The central portion provides at least one passageway communicating with the opening in the outer wall section of the base. Bearing means joins, and supports in spaced apart relationship, the stationary base and the central cylindrical portion of the support assembly. Means are also provided to couple the support assembly to another object.

BRIEF DESCRIPTION OF THE DRAWINGS

The foregoing, and other objects, features and advantages of the present invention will be apparent from consideration of the following specification taken in conjunction with the accompanying drawings in which reference characters designate the same or similar parts throughout the several views.

In the drawings.

DESCRIPTION OF THE PREFERRED EMBODIMENTS

Figure 1:
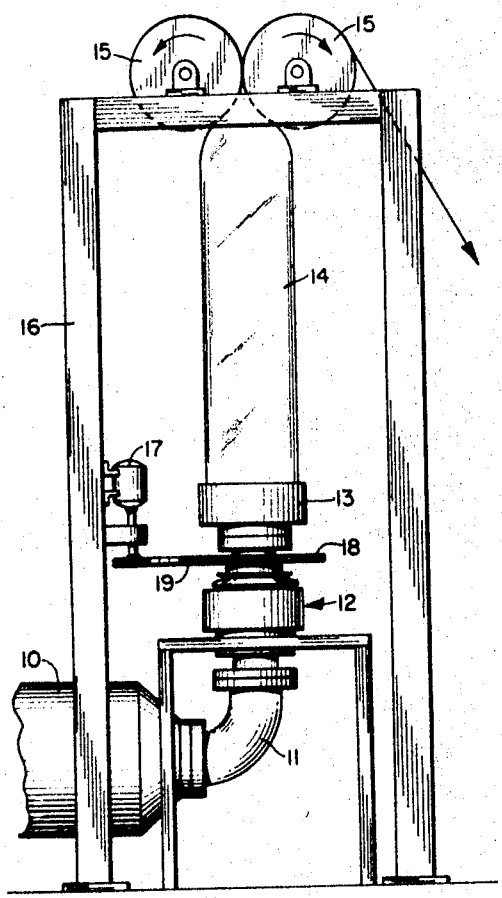
FIGURE 1 is an elevational view of a tubular plastic film extrusion assembly including the rotatable coupling of the present invention.

Referring now to FIGURE 1 the tubular film extrusion apparatus includes an extruder 10 which feeds a molten thermoplastic material through elbow 11 to the rotatable coupling, designated generally by the numeral 12, which has an annular die 13 attached to its upper end. The thermoplastic material is extruded from the die in the form of a thin wall tube 14 which is inflated by air supplied through an opening (not shown) in the face of the die. A pair of nip rolls 15—15 supported by frame 16 are positioned some distance above the die 13. The rolls trap the air within the tube 14 and also flatten the tube as it passes therethrough. The flattened tube is then slit to form film which passes to take-up reels (not shown).

The annular die 13 is rotated by means of a motor 17 which drives the die through sprocket 18 by means of chain 19. As explained hereinbefore the rotation of the die distributes the non-uniform thickness in a helical pattern around the circumference of the thin wall tube 14. If desired the die may be oscillated through any desired arc rather than rotating through 360 degrees.

Figure 2:
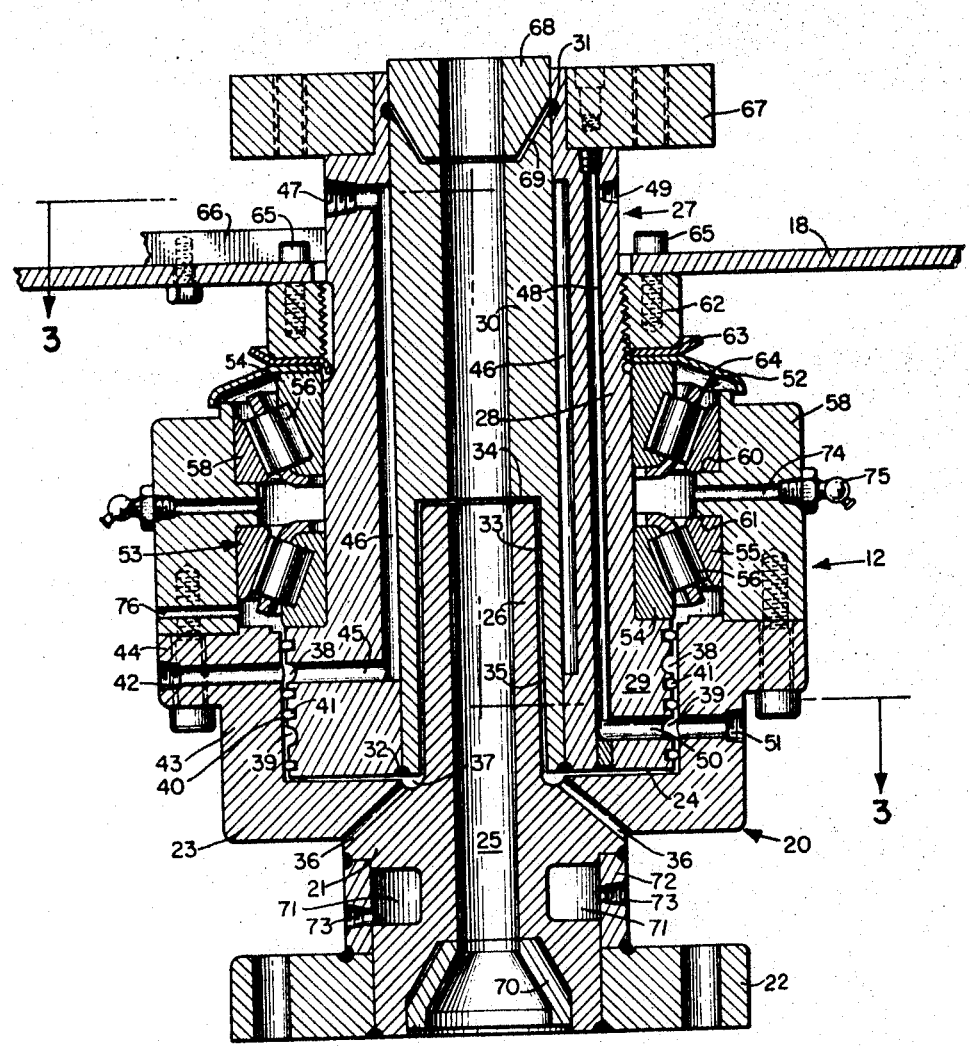
FIGURE 2 is an elevational axial, cross sectional view of one embodiment of the rotatable coupling of the present invention.

Referring now to FIGURE 2 the rotatable coupling 12 illustrated includes a stationary base portion, designated generally by the numeral 20. The base has a lower portion 21 which is adapted to be coupled to a stationary conduit, such as the elbow 11 of the extruder 10, by means of a bottom flange 22. The upper portion 23 of the base is provided with an annular recess 24 in the top face thereof. The annular recess 24, together with the axial opening 25 in the base 20, defines an annular, upwardly extending inner wall section 26 of the base 20.

The rotatable support assembly, designated generally by the numeral 27, is removably mounted on the stationary base 20. The support assembly includes an outer cylindrical body 28 having a lower section 29 of increased diameter received in a close fit in recess 24. A central cylindrical barrel 30 is received within body 28 and is fixedly attached thereto by upper weld line 31 and lower weld line 32. A cylindrical coaxial recess 33 is provided in the bottom surface of barrel 30. The recess 33 provides an annular radial shoulder 34 on the interior of central barrel 30 and defines cylindrical sidewall 35 which has a close sliding fit with the upstanding cylindrical inner wall section 26 of the base 20. The coaxial recess 33 has a depth which is slightly shorter than the height of upstanding cylindrical inner wall section 26 in order to provide a slight clearance between the bottom of lower section 29 of body 28 and the upper face of the base 20 at the bottom of recess 24. A plurality of openings 36 are provided in the bottom of the upper portion of the base. These openings are connected to an annular groove 37 provided in the base 20 at the lower end of inner wall section 26. This groove permits the very small amount of plastic material flowing through the space between the inner wall section 26 and the barrel 30 to drain to the outside.

The lower section 29 of body 28 has provided in the outer surface thereof a semi-circular upper groove 38 and a semi-circular lower groove 39. A rectangular small groove 40 is provided in the cylindrical face of lower portion 29 immediately above and below each of the semi-circular grooves 38 and 39. In each of the rectangular grooves 40 there is received a resilient seal ring 41. The seal ring 41 effectively seals the upper groove 38 from communication with the lower groove 39 and vice versa and also seals the grooves from communication with the outside atmosphere. The seal ring 41 may be made from neoprene or any other suitable sealing material depending upon the utilities service to be fed to the die through the grooves 38 and 39. One type of seal ring that has been found eminently suitable for this service is "Bal-Seal," No. 264, Series 405, which is made from graphite filled Teflon. This ring has been found suitable for use with high pressure steam.

The upper groove 38 is disposed opposite opening 42 provided in outer wall 43 and integral flange 44 of the base 20. An axial opening 45 is provided in lower section 29 of the body which communicates through the upper groove 38 with the opening 42. The opening 45 also communicates with an enclosed cylindrical hollow space 46 provided between the body 28 and the central cylindrical barrel 30. An opening 47 is provided in the upper portion of the body 30 extending from the hollow space 46 to the exterior of the rotating coupling. A longitudinally extending passage 48 is provided in the wall of the body 30. Radial opening 49 in the wall of the body 30 communicates with the passage 48. An opening 50 is provided in the lower section 29 of the body communicating the passageway 48 with the lower semicircular groove 39. An opening 51 is provided in the wall 43 opposite the lower groove 39.

The support assembly 27 is rotatably mounted on stationary base 20 by means of upper bearing assembly 52 and lower bearing assembly 53. Each bearing assembly includes an inner race 54 and an outer race 55 having cylindrical roller bearings 56 therebetween. Other type bearings such as ball bearings may be used if desired. Spacing ring 57 positions the roller bearings equidistantly around the bearing assembly. A bearing retainer collar 58 is seated on top of the flange portion 44 of the base 20 and is removably attached thereto by hex head cap screws 59. The retainer collar is provided with an integrally formed, inwardly extending ring which provides an upper shoulder 60 and a lower shoulder 61. The outer race 55 of the lower bearing assembly is firmly seated on lower shoulder 61 and the outer race 55 of the upper bearing assembly is likewise seated on upper shoulder 60. The inner races 54—54 of the upper and lower bearing assemblies are slidingly received over the exterior of the outer cylindrical body 28 and are held in place thereon by lock nut 62 which is threadably attached to the upper portion of the body 28. The bearing retainer collar 58 is provided with an axially directed opening 74 therein. A grease fitting 75 is attached to the collar in alignment with opening 74 whereby grease may be injected into the bearing assemblies. A plurality of openings 76 (only one of which is shown) is provided through the wall of the collar 58. These openings permit the escape of steam whenever there may be a failure of the uppermost seal ring 41. By venting steam from the area between the collar and the outer body 28 the bearing assemblies 52 and 53 are not damaged by having the lubricant stripped therefrom due to prolonged exposure to high pressure steam. Steam flow through openings 76 also provides the operator with immediate notice of an upper seal failure so he can shut down the joint for repairs.

A lock washer 63 is provided underneath the lock nut along with a slinger ring 64 which prevents entry of foreign material into the bearing assemblies. The sprocket 18 is removably attached to the rotating assembly by means of cap screws 65 received in openings provided in the sprocket and threadably attached to the lock nut 62. Pivotable keys 66 are provided to hold the lock nut 62 in position after the proper compression has been achieved in coupling the bearing assemblies together. Top flange 67 is attached to the upper end of the body 28 of the rotatable support assembly by means of cap screws received in openings provided therein and threadedly attached to the body. The upper portion of the central cylindrical barrel 30 consists of a separable top insert 68 which is received within the opening within the top flange and mates with the lower portion of the barrel 30 by means of a truncated conical mating shoulder 69. This insert is adapted to project slightly above the flange plate to make contact with the entry port of the die mounted on the rotatable coupling.

The lower portion of the stationary base 20 is also provided with a similar insert 70. The base 20 has an annular rectangular recess 71 which is covered by collar 72 and thereby provides an enclosed hollow space adjacent the base of the die. Openings 73—73 are provided on opposite sides of the collar.

As pointed out in the aforementioned co-pending application it is extremely important that the outside diameter and surface finish of the upstanding cylindrical wall section 26 be held to extremely close tolerance. Additionally the inside diameter of the recess 33 in the bottom of barrel 30 should be held to close tolerance and finished to a smooth surface in order the the adjacent surfaces be separated by only a very small dimension in this critical area. For best results it has been found that the spacing between the two surfaces should be from about 0.001 inch to about 0.010 inch. Spaces exceeding 0.010 inch may be utilized however excessive leakage of plastic through the spacing may occur. It is preferred to have the spacing between the shoulder 34 and the top of the inner wall section 26 to be from about 0.007 inch to about 0.008 inch when operating at plastic extrusion temperature. The space separating the outer sidewall of inner wall 26 and the wall of recess portion 33 of the barrel 30 is preferably from about 0.003 inch to about 0.004 inch. When spaces according to the foregoing recommendations are used the joint of the present invention has been found to permit a controlled leakage of about one half ounce of molten polyethylene per hour when the rotating joint is used for the manufacture of polyethylene film from low density polyethylene feed-stock. It is preferred to taper the opening 36 to increase the diameter toward the outside of the joint in order that the opening will remain clear of carbonized polyethylene.

In the assembly and operation of the rotating joint of the present invention it is preferred to thoroughly clean all of the separate components and lightly oil them before assembly. It is recommended that a light coating of silicone grease be applied to the interior of wall portion 43 facing the recess 24 and to the exterior wall surface provided by the lower section 29 of the body in order that these mating surfaces shall be adequately lubricated and sealed. The seal rings 41 should be placed in the rectangular grooves 40 and checked to see that they can be compressed fully into the rectangular groove 40 in order that no portion extend over the edge of the groove. A ring clamp is placed over the seal rings and compressed and allowed to stand for about eight hours and then removed and the seals reinspected. The clamp is again reapplied and the body portion is pressed into the recess 24 and the clamping ring is slipped upwards off the lower body portion 29. The bearing assemblies 52 and 53 are placed within the retainer collar 58 and the assembly then placed over the outer cylindrical body 28. Shims may be required to be placed between the top of the flange 44 and the bottom of the bearing retainer collar 58 in order to adjust the spacing between the shoulder 34 of barrel 30 and the top of the inner cylindrical wall section 26. In operation of one exemplary form of the apparatus constructed it was necessary to set a gap of 0.001 to 0.002 inch between shoulder 34 and the top of tubular section 26 when the joint was cold in order to achieve the desired 0.007 to 0.008 inch spacing when the joint was at operating temperature. This gap is measured by using an appropriate size feeler gauge connected to a rod in order that it may be inserted through the opening 25 of the rotating joint to measure the spacing in this gap. The above cold spacings have been found satisfactory for a polyethylene extruder running at about 2,000 to 2,500 p.s.i.g. melt pressure. It is particularly important to readjust the shim thicknesses and ascertain the gap on shoulder 34 each time bearing assemblies are replaced because variances in the thicknesses of the races 54 and 55 will alter the positioning of the barrel 30 in relation to the top surface of upstanding inner wall 26.

In constructing the rotating joint of the present invention the diameter of the lower section 29 of the body 28 should be made as small as possible and still provide sufficient diameter to mount bearing assemblies 52 and 53 of sufficient size to support the weight of a rotating die without undue wear on the bearings. By keeping the diameter small the peripherial linear speed of any point on the seal rings 41 is significantly reduced thus reducing the wear on these rings and increasing their life. In one embodiment of the present invention constructed which had an overall height of 16½ inches the diameter of lower body section 29 was only 7 inches. This joint was used to replace a commercially available rotating joint which had a 14 inch diameter body portion wherein the seal rings were mounted. At the same rate of rotation of the annular die the seal rings in the joint of this invention will have a life expectancy of twice that of the seal rings used in the prior art joint.

The rotating joint of the present invention may be constructed from any material sufficiently strong to withstand the high temperature and pressure to which it will be exposed in the services intended. Preferred materials are tool steel, stainless steel and other alloy steels which possess the required strength and corrosion resistance for the intended service. Commercially available steel has been found satisfactory for manufacturing the rotating joint of the present invention when the joint is to be utilized in manufacturing polyethylene, polypropylene film. The joint of the present invention has been found satisfactory for use in manufacturing polyvinyl chloride films by the incorporation of a stainless steel liner in the flow passage 25 extending through the joint in order to protect the steel from contact with corrosive molten polyvinyl chloride. Commerical models of the joint of the present invention have been used for pressure as high as 5,000 p.s.i. when utilized to extrude molten plastic material at a temperature of up to 400° F.

The joint can be used for other materials in addition to the plastics pointed out hereinbefore, i.e., for materials such as nylon, polystyrene, and copolymers of various materials such as vinyl chloride and vinylidene chloride. In general it is useful in services for extruding a plastic material of all types. However, the invention is not limited to use in a plastic extruder assembly but may be used in other services such as the loading of asphalt through a rotating joint or the feeding of highly viscous materials such as a paraffin wax to a centrifuge or to other devices wherein a rotating joint is desired.

The rotating joint of the present invention provides an advantage in that utility services may be supplied to the rotating die through the rotating joint without loss through leakage being incurred. In normal operation one or more passages as pointed out hereinbefore, are provided in order to supply the various utilities required to a rotating die. In the version of the rotating joint illustrated there is only one inlet and outlet passageway depicted, however, it should be understood that the rotating joint of the present invention is not limited to one inlet and one outlet passage but may include a multiplicity of inlet and outlet passages whereby different services such as steam, water, air may be supplied to a rotating die.

Figure 3:
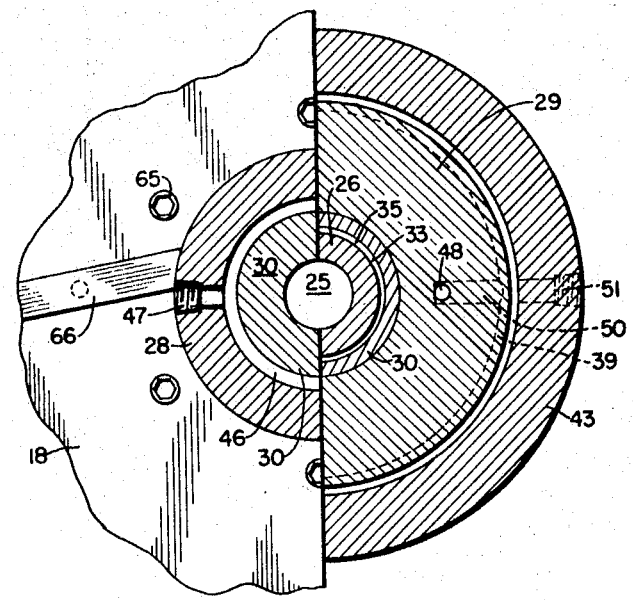
FIGURE 3 is a plan view, partially in section, of FIGURE 2 along the line 3—3.

Referring to FIGURE 2 the rotating joint exemplified may be utilized to supply steam to the rotating die in order to heat the die to its operating temperature and to maintain both the die and the joint in operating condition for extruding molten plastic. The steam connection is normally made to the opening 42 provided in the outer wall 43 of the base and flows therefrom into the semi-circular groove 38 in the body 30. The steam then flows around this annular groove irregardless of what position the opening 45 may be in relation to the opening 42. The steam then enters opening 45 and passes therethrough to the hollow space 46 in the interior of the rotating support assembly 27. The steam completely fills the hollow space 46 and thus heats the entire rotating joint to the required operating temperature. The steam then passes from hollow space 46 through outlet port or opening 47 in the upper part of the body where a pipe or conduit (not shown) leads the steam to the die which is normally mounted on the top of flange 67. Steam exhaust from the die is returned by a pipe (not shown) connected to opening 49 on the right hand side of FIGURE 3 and vents through longitudinal passageway 48 to opening 50 and then into the annular space defined by the semi-circular groove 39 in the lower part of section 29 of the body. The exhaust steam follows the semi-circular groove until it returns to the opening 51 provided for steam exhausting from the rotating joint. In order to utilize the residual heating value of the steam it is common practice to connect opening 51 to an opening 73 by a pipe thereby to circulate the steam through the hollow recess 71 in the base of the joint to provide heat to this area of the joint. Residual steam and condensate are then drained through the other opening 73 and passed through a steam trap (not shown) to vent.

As mentioned hereinbefore the present invention includes rotating joint embodiments having a multiplicity of passages for a number of services. In order to accommodate these it is only necessary that the height of wall section 43 be extended and that lower section 29 of the body 28 be made of a comparable height and provided with two sets of grooves for each additional service desired. Additional longitudinally extending channels may be provided in the wall of outer cylindrical body 28 to conduct the services to the die and the residual materials from the die if necessary. One preferred model of the rotating joint of the present invention has two sets of inlet passages whereby steam and air are conducted to the die. It is desired that a continual air flush be supplied to the interior of the bubble to remove condensables from within the inflated plastic tubing 14.

While there has been described what is at present a preferred embodiment of the present invention it will be apparent to those skilled in the art that various modifications and changes may be made without departing from the essence of the present invention.

What is claimed is:

1. A rotating coupling having an axial opening therein comprising:
   (a) a stationary base including,
      (i) a lower portion adapted to be coupled to another object,
      (ii) an upper portion having an annular recess provided in the upper face thereof defining an outer wall section and, together with said axial opening, an integrally formed annular inner wall section, said outer wall section having a plurality of openings therethrough;
   (b) a rotatable support assembly including,
      (i) a central cylindrical portion providing a coaxial cylindrical recess in the bottom thereof receiving said annular inner wall section of said base, whereby their adjacent sidewall surfaces are separated by a very small dimension, and having a plurality of longitudinally extending passageways provided in said cylindrical portion each communicating with a separate one of said plurality of openings in said outer wall section of said base, the axial lengths of said inner wall section and said cylindrical recess being substantially equal;
      (ii) sealing means extending between an outer wall of said rotatable support assembly and the inner wall of said upper portion of said stationary base adjacent each of said plurality of openings and said plurality of passageways;
      (iii) bearing means joining, and supporting in spaced apart relationship, said stationary base and said central cylindrical portion of said support assembly, said bearing means being positioned between said other wall section and said cylindrical portion, and
      (iv) means to couple said support assembly to another object.

2. The rotating coupling defined in claim 1 wherein one of said passageways includes a coaxially aligned, cylindrically shaped hollow section within the interior of said cylindrical portion of said support assembly.

3. The rotating coupling defined in claim 1 wherein said bearing means includes a bearing retainer attached to said outer wall section of said upper portion of said base.

4. The rotating coupling defined in claim 1 wherein said each one of said passageways includes an annular groove provided in the outer surface of the lower portion of said central cylindrical portion of said support assembly.

5. The rotating coupling defined in claim 1 wherein said lower portion of said stationary base provides an enclosed annular channel therein.

6. The rotating coupling of claim 1 wherein the ratio of the height of said coupling to the diameter of the lower portion of said central cylindrical portion of said support assembly is no greater than 2.0.

7. The rotating coupling of claim 1 wherein said small dimension is from about 0.003 inch to about 0.004 inch.

8. The rotating coupling of claim 1 wherein the distance separating the opposing top surface of said annular inner wall section and the surface at the bottom of said coaxial recess in said central cylindrical portion is from about 0.007 inch to about 0.008 inch.

References Cited

UNITED STATES PATENTS

| | | | |
|---|---|---|---|
| 1,324,967 | 12/1919 | Hoting | 285—134 |
| 1,883,509 | 10/1932 | Boone | 285—280 X |
| 2,322,679 | 6/1943 | Williamson | 285—190 X |
| 2,412,287 | 12/1946 | Phillips | 285—136 |
| 2,429,929 | 10/1947 | Fisher | 285—276 X |
| 2,701,146 | 2/1955 | Warren | 285—134 |
| 2,820,650 | 1/1958 | Leopold | 285—134 |
| 3,020,588 | 2/1962 | Ferguson et al. | 264—95 |
| 3,351,360 | 11/1967 | Faccou | 285—136 X |

FOREIGN PATENTS

| | | |
|---|---|---|
| 759,098 | 10/1956 | Great Britain. |
| 859,491 | 1/1961 | Great Britain. |

THOMAS F. CALLAGHAN, Primary Examiner

U.S. Cl. X.R.

285—14, 281, 331